(12) United States Patent
Iwamoto (10) Patent No.: US 9,738,317 B2
(45) Date of Patent: Aug. 22, 2017

(54) FASTENING PORTION STRUCTURE OF VEHICLE

(71) Applicant: TOYOTA JIDOSHA KABUSHIKI KAISHA, Toyota-shi (JP)

(72) Inventor: Yasunori Iwamoto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/913,584

(22) PCT Filed: Aug. 28, 2014

(86) PCT No.: PCT/IB2014/001650
§ 371 (c)(1),
(2) Date: Feb. 22, 2016

(87) PCT Pub. No.: WO2015/028877
PCT Pub. Date: Mar. 5, 2015

(65) Prior Publication Data
US 2016/0207569 A1 Jul. 21, 2016

(30) Foreign Application Priority Data
Aug. 30, 2013 (JP) .................................. 2013-179796

(51) Int. Cl.
*F16B 43/02* (2006.01)
*B62D 21/11* (2006.01)
(Continued)

(52) U.S. Cl.
CPC ............ *B62D 21/11* (2013.01); *B62D 27/065* (2013.01); *F16B 5/0208* (2013.01)

(58) Field of Classification Search
CPC ....... F16B 5/0208; F16B 43/02; B62D 27/065
(Continued)

(56) References Cited

U.S. PATENT DOCUMENTS 5,577,854 A * 11/1996 Jacob ...................... B60G 7/00
280/93.508
5,890,740 A 4/1999 Kami
(Continued)

FOREIGN PATENT DOCUMENTS

JP 58-141973 A 8/1983
JP 61-175336 A 8/1986
(Continued)

OTHER PUBLICATIONS

International Search Report issued Dec. 18, 2014 in PCT/IB2014/001650 filed on Aug. 28, 2014.
(Continued)

*Primary Examiner* — Roberta Delisle
(74) *Attorney, Agent, or Firm* — Oblon, McClelland, Maier & Neustadt, L.L.P.

(57) ABSTRACT

An upper plate portion of a suspension member and a bottom plate portion of a bracket that is placed on an upper side thereof, and the like, as objects to be fastened, are sandwiched between a weld nut and an end surface on a vehicle upper side of a collar. A protruding portion that protrudes toward a bolt through-hole side of the bottom plate portion of the bracket is formed on an end portion on the vehicle upper side of the collar. The protruding portion is formed along an entire periphery around an axis of the collar. Also, a drainage groove that leads from the end surface on the vehicle upper side to an outer peripheral surface of the collar is formed in the collar.

9 Claims, 5 Drawing Sheets

(51) Int. Cl.
  *B62D 27/06* (2006.01)
  *F16B 5/02* (2006.01)
(58) Field of Classification Search
  USPC .............................. 411/353, 517, 427, 546
  See application file for complete search history.

(56) References Cited

U.S. PATENT DOCUMENTS

| | | | | |
|---|---|---|---|---|
| 5,980,174 | A * | 11/1999 | Gallagher | F16B 5/01 29/897.32 |
| 6,280,132 | B1 * | 8/2001 | Szczukowski | F02F 7/006 411/107 |
| 6,287,063 | B1 * | 9/2001 | Moller | B62D 27/065 411/135 |
| 7,771,149 | B2 * | 8/2010 | Bauer | F16B 41/002 411/353 |
| 8,807,902 | B2 * | 8/2014 | Wang | F16B 37/061 411/353 |
| 2002/0009350 | A1 * | 1/2002 | Radtke | F16B 41/002 411/353 |
| 2002/0098058 | A1 * | 7/2002 | Caldera | F16B 19/02 411/353 |
| 2004/0037670 | A1 * | 2/2004 | Rausch | F16B 37/122 411/546 |
| 2005/0046215 | A1 | 3/2005 | Chung | |

FOREIGN PATENT DOCUMENTS

| | | |
|---|---|---|
| JP | 7-323868 A | 12/1995 |
| JP | 2005-67584 A | 3/2005 |
| JP | 2006-96093 A | 4/2006 |
| JP | 2006-240325 A | 9/2006 |
| JP | 2006-327274 A | 12/2006 |
| JP | 2007-253642 A | 10/2007 |
| JP | 2012-61921 A | 3/2012 |

OTHER PUBLICATIONS

Office Action issued Jun. 30, 2015 in Japanese Patent Application No. 2013-179796 (submitting partial English language translation only).

* cited by examiner

FASTENING PORTION STRUCTURE OF VEHICLE

BACKGROUND OF THE INVENTION

1. Field of the Invention

The invention relates to a fastening portion structure of a vehicle.

2. Description of Related Art

Japanese Patent Application Publication No. 2007-253642 (JP 2007-253642 A), for example, describes a fastening portion structure of a vehicle, in which a plurality of plate members are sandwiched between a nut or a head portion of a bolt, and an upper end surface of a cylindrical collar.

However, with this kind of structure, water may get inside the collar from a gap in the sandwiching portion between the nut or the head portion of the bolt, and the upper end surface of the cylindrical collar, so water might end up accumulating inside the collar.

SUMMARY OF THE INVENTION

The invention thus provides a fastening portion structure of a vehicle, capable of preventing or inhibiting water from accumulating inside a collar.

A first aspect of the invention relates to a fastening portion structure of a vehicle, which includes a collar including a cylindrical shape, the collar including an end surface on one side in an axial direction of the collar and the other end in the axial direction of the collar, the end surface on one side in an axial direction of the collar being arranged farther toward a vehicle upper side than the other end in the axial direction of the collar; a first plate portion the end surface on the one side in the axial direction of the collar abutting against the first plate portion, the first plate portion including a first hole being formed in a position overlapping with a through-portion of the collar through the first plate portion; a second plate portion being placed on an opposite side of the first plate portion from a side with the collar, the second plate portion including a second hole being formed in a position overlapping with the through-portion of the collar and the first hole of the first plate portion through the second plate portion; a bolt being inserted through the through-portion of the collar, the first hole of the first plate portion, and the second hole of the second plate portion; a nut applying a fastening load to the collar, the first plate portion, and the second plate portion, together with the bolt, by the bolt being screwed to the nut; and a protruding portion being formed on at least one of an end portion on the one side in the axial direction of the collar and an end portion on the side of the first plate portion with the first hole, the protruding portion protruding toward the second hole of the second plate portion.

According to the structure described above, the end surface on one side in the axial direction of the collar is arranged farther toward the vehicle upper side than the end surface on the other side in the axial direction, and the first plate portion is arranged on the end surface on the one side in the axial direction of the collar, and the second plate portion is placed on the first plate portion. Also, the bolt is inserted through the through-portion of the collar, the first hole of the first plate portion, and the second hole of the second plate portion. The collar, the first plate portion, and the second plate portion receive a fastening load by this bolt being screwed to the nut. Here, the protruding portion that protrudes toward the second hole side of the second plate portion is formed in at least one of the end portion on the one side in the axial direction of the collar and the end portion on the side of the first plate portion with the first hole, so water is able to be inhibited from getting inside the collar by this protruding portion.

As described above, the fastening portion structure of a vehicle has a beneficial effect in which it is able to prevent or inhibit water from accumulating inside the collar.

A drainage portion may be formed on the collar, the drainage portion leading from at least one of the end surface on the one side in the axial direction of the collar and an inner peripheral surface of the through-portion to an outer peripheral surface of the collar.

According to this structure, the drainage portion that leads from at least one of the end surface on the one side in the axial direction of the collar and the inner peripheral surface of the through-portion to the outer peripheral surface of the collar, is formed on the collar, so water that has reached the at least one is discharged to the outer peripheral side of the collar through the drainage portion.

The fastening portion structure of a vehicle has a beneficial effect in which it is able to prevent or inhibit water from accumulating inside the collar by the drainage function.

In the fastening portion structure described above, a flat end surface may be formed on the end surface on the one side in the axial direction of the collar, the flat end surface including a contact surface with the first plate portion, the protruding portion may be set to a radially inner side of the collar with respect to the flat end surface, the protruding portion being formed along an entire periphery around an axis of the collar, and the drainage portion may be formed intersecting with a boundary portion between the flat end surface and a protruding surface of the protruding portion.

According to this structure, the flat end surface including a contact surface with the first plate portion, is formed on the end surface on the one side in the axial direction of the collar, and the protruding portion is set to a radially inner side of the collar with respect to the flat end surface, and is formed along an entire periphery around the axis of the collar. As a result, water is inhibited from getting inside the collar by the protruding portion along the entire periphery of the collar. Also, the drainage portion is formed intersecting with the boundary portion between the flat end surface and the protruding surface of the protruding portion. Therefore, water that has flowed from the protruding surface to the side with flat end surface along the end surface on one side in the axial direction of the collar will flow to the drainage portion along the boundary portion between the protruding surface and the flat end surface. As a result, water on the end surface on the one side in the axial direction of the collar is efficiently discharged before it gets inside the collar.

This fastening portion structure of a vehicle has a beneficial effect in which water is able to be efficiently drained before it gets inside the collar, and the rigidity of the collar end surface with respect to a fastening load is also able to be easily ensured if there is only one passage of the drainage portion.

In the fastening portion structure described above, a recessed portion may be formed on a surface opposing the protruding portion, of one of the nut and a head portion of the bolt, whichever is arranged opposing the protruding portion, the recessed portion being recessed toward an opposite side from a side with the protruding portion.

According to this structure, a recessed portion that is recessed toward the opposite side from the side with the protruding portion is formed on the surface opposing the protruding portion, of one of the nut and a head portion of the bolt, whichever is arranged opposing the protruding portion, so interference between the protruding portion and the one is able to be more easily avoided, even if the protrusion dimension of the protruding portion is set long, compared to when the recessed portion is not provided.

This fastening portion structure of a vehicle has a beneficial effect in which the protrusion dimension of the protruding portion can be set long, i.e., water is able to be effectively prevented or inhibited from getting inside the collar, while avoiding a decrease in fastening load caused by interference between the nut or the head portion of the bolt and the protruding portion.

With the fastening portion structure described above, a protruding portion may be formed on the end portion on the one side in the axial direction of the collar.

With the fastening portion structure described above, a protruding portion may be formed on an end portion on a side of the first plate portion with the first hole.

With the fastening portion structure described above, a drainage groove and a drainage hole may be formed in the collar, the drainage groove leading from the end surface on the one side in the axial direction of the collar to an outer peripheral surface of the collar, the drainage hole leading from an inner peripheral surface of the through-portion to an outer peripheral surface of the collar.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

[First example embodiment]

A fastening portion structure of a vehicle according to a first example embodiment of the invention will be described with reference to FIGS. 1 and 2. In the drawings, arrow FR indicates a vehicle front side, arrow UP indicates a vehicle upper side, and arrow IN indicates a vehicle width direction inside.

Figure 1:
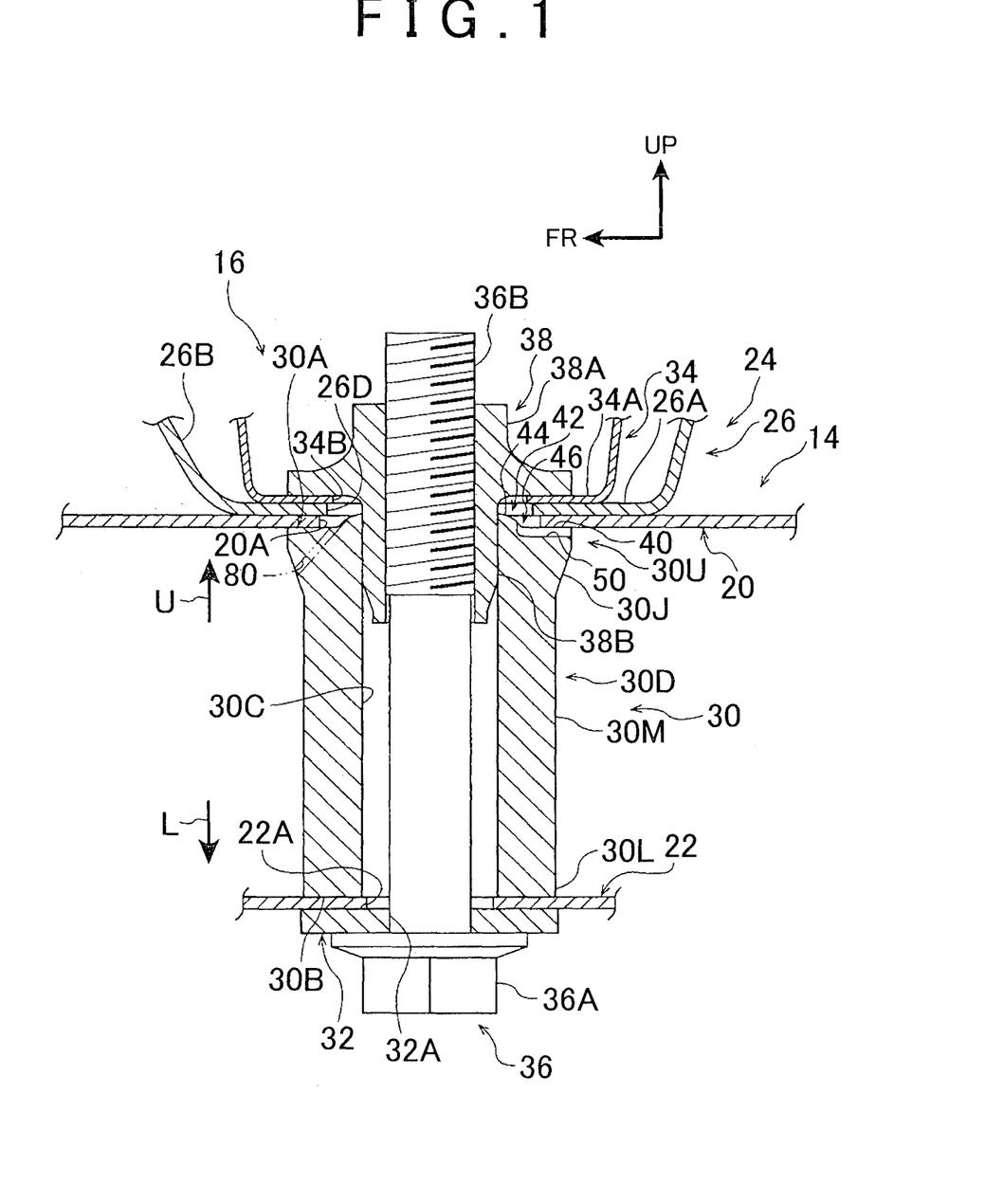
FIG. 1 is a longitudinal sectional view of a fastening portion structure of a vehicle according to a first example embodiment of the invention.

FIG. 1 is a longitudinal sectional view of the fastening portion structure of a vehicle according to this example embodiment. Also, FIG. 2 is an exploded perspective view of a portion of a vehicle front portion 10 to which the fastening portion structure of a vehicle according to this example embodiment has been applied.

Figure 2:
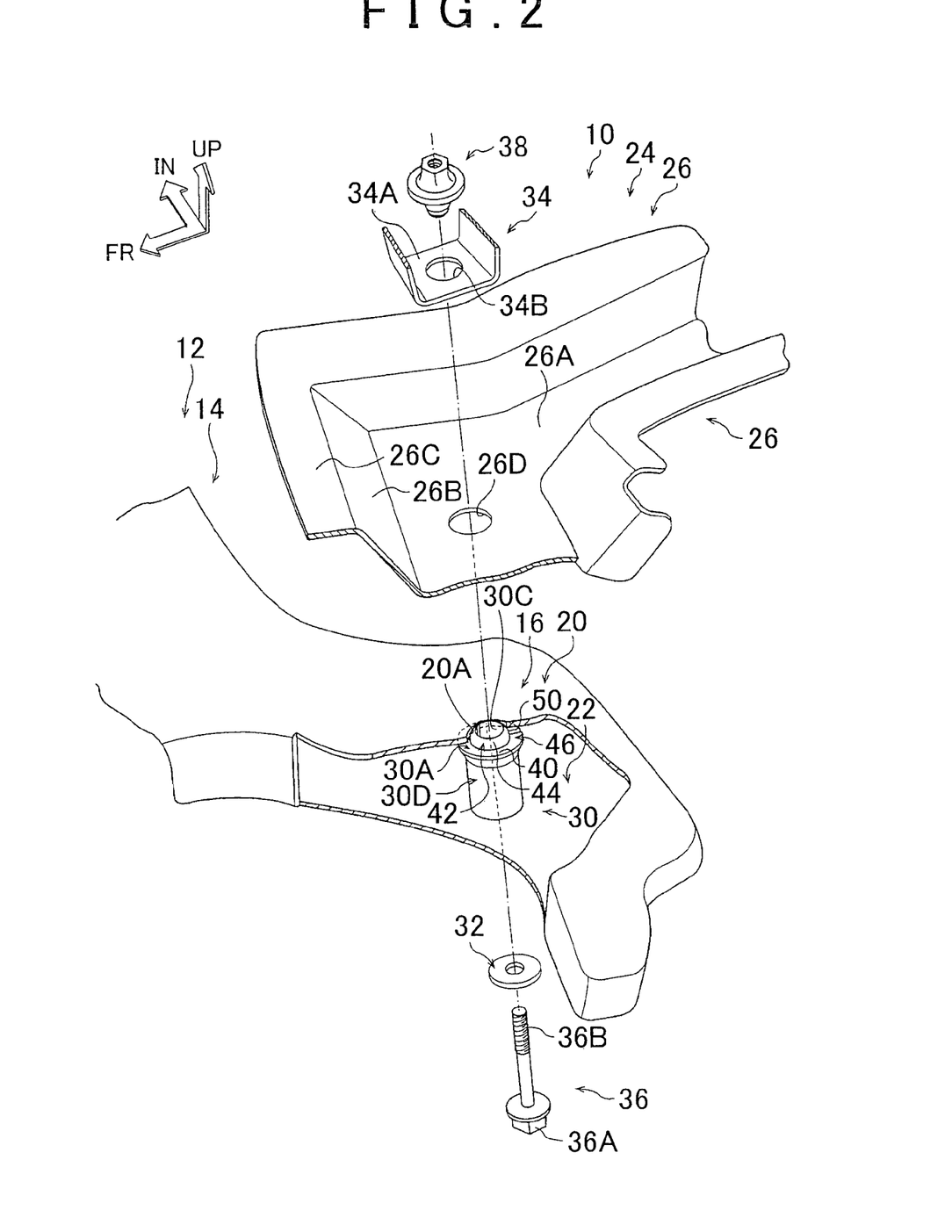
FIG. 2 is an exploded perspective view of a portion of a vehicle front portion to which the fastening portion structure of a vehicle according to the first example embodiment of the invention has been applied.

As shown in FIG. 2, a suspension member 14 is arranged on the vehicle front portion 10. The suspension member 14 forms a portion of a front suspension 12, and a suspension arm, not shown, is pivotally mounted thereto. FIG. 2 is a view of a left rear portion (a portion on the vehicle left side that is a rear portion in a vehicle longitudinal direction) of the suspension member 14, and shows a mounting portion of the suspension arm, and a portion of the surrounding portion thereof, of the left rear portion in a broken state.

Both left and right side rear end portions of the suspension member 14 each includes a pair of upper and lower plate portions, i.e., an upper plate portion 20 as a first plate portion that forms an upper surface, and a lower plate portion 22 that forms a lower surface and is arranged opposing the upper plate portion 20, with a portion thereof being a bracket mounting portion 16. The bracket mounting portion 16 is a portion for mounting a bracket 26 that forms a portion of a front side member 24, and is provided near a mounting portion, not shown, of the suspension arm. In the bracket mounting portion 16, an upper hole 20A that serves as a first hole is formed through the upper plate portion 20, and a lower hole 22A is formed through the lower plate portion 22, as shown in FIG. 1.

A collar 30 is provided between the upper plate portion 20 and the lower plate portion 22 of the bracket mounting portion 16. The collar 30 has a cylindrical shape, with an axial direction thereof set in a vehicle vertical direction. An end surface 30A on one side in the axial direction (i.e., the side in the direction of arrow U) of the collar 30 is arranged farther toward the vehicle upper side than an end surface 30B on the other side in the axial direction (i.e., the side in the direction of arrow L). This collar 30 will be described in detail later.

The end surface 30A on the one side in the axial direction (i.e., the side in the direction of arrow U) of the collar 30 abuts against the upper plate portion 20, and the end surface 30B on the other side in the axial direction (i.e., the side in the direction of arrow L) of the collar 30 abuts against the lower plate portion 22. Also, the upper hole 20A of the upper plate portion 20 and the lower hole 22A of the lower plate portion 22 are formed in positions overlapping with a through-portion 30C of the collar 30.

An annular-shaped washer (thin plate collar) 32 is placed on the opposite side of the lower plate portion 22 from the side with the collar 30 (i.e., on the vehicle lower side). A through-portion 32A of the washer 32 is arranged in a position overlapping with the through-portion 30C of the collar 30 and the lower hole 22A of the lower plate portion 22.

The through-portion 30C of the collar 30, the lower hole 22A of the suspension member 14, and the through-portion 32A of the washer 32 are all coaxially arranged. Also, the through-portion 32A of the washer 32 is set to have a smaller diameter than the lower hole 22A of the suspension member 14, and the lower hole 22A of the suspension member 14 is set to have a smaller diameter than the through-portion 30C of the collar 30.

Meanwhile, a bottom plate portion 26A as a second plate portion that forms a portion of the bracket 26 is placed on the opposite side of the upper plate portion 20 from the side with the collar 30 (i.e., on the vehicle upper side). A bolt through-hole 26D as a second hole is formed through the bottom plate portion 26A of the bracket 26. This bolt through-hole 26D is arranged in a position overlapping with the through-portion 30C of the collar 30 and the upper hole 20A of the upper plate portion 20 of the suspension member 14. The bracket 26 has a vertical plate portion 26B that stands erect from a peripheral edge portion of the bottom plate portion 26A, and a flange portion 26C (see FIG. 2) that is bent from an upper end of the vertical plate portion 26B is joined to another component, not shown, of the front side member 24.

A seat plate portion 34A of a reinforcing bracket 34 is placed on the opposite side of the bottom plate portion 26A of the bracket 26 from the side with the collar 30 (i.e., on the vehicle upper side). The seat plate portion 34A of the reinforcing bracket 34 is joined to the bottom plate portion 26A of the bracket 26 by spot welding.

A bolt through-hole 34B is formed through the seat plate portion 34A of the reinforcing bracket 34. This bolt through-hole 34B is arranged in a position overlapping with the bolt through-hole 26D of the bracket 26.

The bolt through-hole 34B of the reinforcing bracket 34, the bolt through-hole 26D of the bracket 26, the upper hole 20A of the suspension member 14, and the through-portion 30C of the collar 30 are all coaxially arranged. Also, the bolt through-hole 34B of the reinforcing bracket 34, the bolt through-hole 26D of the bracket 26, and the upper hole 20A of the suspension member 14 are all set to have a larger diameter than the through-portion 30C of the collar 30. Also, the bolt through-hole 26D of the bracket 26 is set to have a smaller diameter than the upper hole 20A of the suspension member 14, and the bolt through-hole 34B of the reinforcing bracket 34 is set to have a smaller diameter than the bolt through-hole 26D of the bracket 26.

A weld nut 38 as a nut is fixed beforehand to an outer peripheral portion of the bolt through-hole 34B, on an upper surface of the seat plate portion 34A of the reinforcing bracket 34 (i.e., a surface on the side opposite the side with the collar 30). The weld nut 38 includes a nut main body 38A arranged on the opposite side of the seat plate portion 34A of the reinforcing bracket 34 from the side with the collar 30, and an positioning portion 38B that extends from the nut main body 38A toward the collar 30.

The positioning portion 38B of the weld nut 38 is a cylindrical portion that is coaxially and integrally formed with the nut main body 38A, and extends into the through-portion 30C of the collar 30 from a portion on the axial center portion side of the nut main body 38A. An outer diameter of the positioning portion 38B of the weld nut 38 is set slightly smaller than an inner diameter of the through-portion 30C of the collar 30. Also, an inner diameter of the positioning portion 38B of the weld nut 38 is set to a dimension that enables a shaft portion 36B of a bolt 36 to be inserted through it.

The bolt 36 passes through the through-portion 32A of the washer 32, the lower hole 22A of the suspension member 14, the through-portion 30C of the collar 30, the upper hole 20A of the suspension member 14, the bolt through-hole 26D of the bracket 26, and the bolt through-hole 34B of the reinforcing bracket 34, from the vehicle lower side. Also, the bolt 36 and the weld nut 38 apply a fastening load to the washer 32, the lower plate portion 22 of the suspension member 14, the collar 30, the upper plate portion 20 of the suspension member 14, the bottom plate portion 26A of the bracket 26, and the seat plate portion 34A of the reinforcing bracket 34, by the shaft portion 36B of the bolt 36 being screwed into the weld nut 38. That is, a head portion 36A of the bolt 36 and the nut main body 38A of the weld nut 38 tighten a member sandwiched between these. Although not shown, a suitable sealer is applied to an overlapping portion between the head portion 36A of the bolt 36 and the collar 30, as well as to an overlapping portion between the nut main body 38A of the weld nut 38 and the collar 30.

Next, the shape of the collar 30 will be described in detail.

A flat end surface 40 that forms a planar-shaped surface including a contact surface of the suspension member 14 that contacts the upper plate portion 20, is formed on an end surface 30A on one side in the axial direction (i.e., on the side in the direction of arrow U) of the collar 30. Also, a protruding portion 42 is set along the entire region on the radially inner side of the collar 30 with respect to the flat end surface 40, on an end portion 30U on the one side in the axial direction (i.e., on the side in the direction of arrow U) of the collar 30. That is, the protruding portion 42 is formed along the entire periphery around the axis of the collar 30. This protruding portion 42 protrudes (rises up) toward the bolt through-hole 26D side of the bottom plate portion 26A of bracket 26. In this example embodiment, a protrusion amount of the protruding portion 42 increases towards the radially inner side of the collar 30. A top portion of the protruding portion 42 comes up inside the bolt through-hole 26D of the bottom plate portion 26A of the bracket 26.

An axially intermediate portion 30M of the collar 30 and an end portion 30L on the other side in the axial direction (i.e., the side in the direction of arrow L) of the collar 30 are set to a constant outer diameter. An outer diameter of the end portion 30U on one side in the axial direction (i.e., the side in the direction of arrow U) of the collar 30 is set larger than an outer diameter of the axially intermediate portion 30M of the collar 30 and an outer diameter of the end portion 30L on the other side in the axial direction (i.e., the side in the direction of arrow L) of the collar 30. Also, an outer peripheral portion from the axially intermediate portion 30M of the collar 30 all the way to the end portion 30U on the one side in the axial direction (i.e., the side in the direction of arrow U) of the collar 30, is a gradually changing portion 30J in which the outer diameter thereof gradually becomes wider towards one side in the axial direction (i.e., the side in the direction of arrow U) of the collar 30.

Also, a drainage groove 50 (a cutout groove) as a drainage portion that leads from the end surface 30A on one side in the axial direction (i.e., the side in the direction of arrow U) of the collar 30 to an outer peripheral surface 30D of the collar 30, is formed in the collar 30. This drainage groove 50 is formed extending linearly in the radial direction of the collar 30, and intersecting with a boundary portion 46 between the flat end surface 40 and the protruding surface 44 of the protruding portion 42. Only one drainage groove 50 is formed in this example embodiment, and the groove depth dimension is set longer than the groove width dimension.

(Operation and Effects)

Next, the operation and effects of the example embodiment described above will be described.

In this example embodiment, the protruding portion 42 that protrudes toward the bolt through-hole 26D side of the bottom plate portion 26A of the bracket 26 is formed on the end portion 30U on one side in the axial direction (i.e., on the side in the direction of arrow U) of the collar 30. Therefore, even if rainwater or the like gets in from the gap in the sandwiching portion between the weld nut 38 and the end surface 30A on one side in the axial direction (i.e., on the side in the direction of arrow U) of the collar 30, or condensed water (i.e., moisture in the air that has condensed) produced in the gap flows onto the end surface 30A on one side in the axial direction (i.e., on the side in the direction of arrow U) of the collar 30, the water is inhibited from getting inside the collar 30 by the protruding portion 42.

Also, this protruding portion 42 is set to the radially inner side of the collar 30 with respect to the flat end surface 40, and is formed along the entire periphery around the axis of the collar 30. Therefore, water is inhibited from getting inside the collar 30 by the protruding portion 42 along the entire periphery of the collar 30.

Further, in this example embodiment, the drainage groove 50 that leads from the end surface 30A on one side in the axial direction (i.e., the side in the direction of arrow U) of the collar 30 to the outer peripheral surface 30D of the collar 30, is formed on the collar 30. Therefore, water that has reached the end surface 30A on one side in the axial direction (i.e., the side in the direction of arrow U) of the collar 30 is discharged to the outer peripheral side of the collar 30 via the drainage groove 50.

Also, this drainage groove 50 is formed intersecting with the boundary portion 46 between the flat end surface 40 and the protruding surface 44 of the protruding portion 42, on the end surface 30A on one side in the axial direction (i.e., the side in the direction of arrow U) of the collar 30. Therefore, water that has flowed from the protruding surface 44 to the side with the flat end surface 40 on the end surface 30A on one side in the axial direction (i.e., the side in the direction of arrow U) of the collar 30 will travel along the boundary portion 46 between the protruding surface 44 and the flat end surface 40, and flow to the drainage groove 50. As a result, water on the end surface 30A on one side in the axial direction (i.e., the side in the direction of arrow U) of the collar 30 is able to be efficiently discharged before it gets into the collar 30.

As described above, with the fastening portion structure of a vehicle according to this example embodiment, it is possible to prevent or suppress water from accumulating inside the collar 30.

Also, in this example embodiment, only one drainage groove 50 is formed, so it is also easy to ensure the rigidity of the end surface 30A of the collar 30 with respect to a fastening load.

[Second example embodiment]

Figure 3:
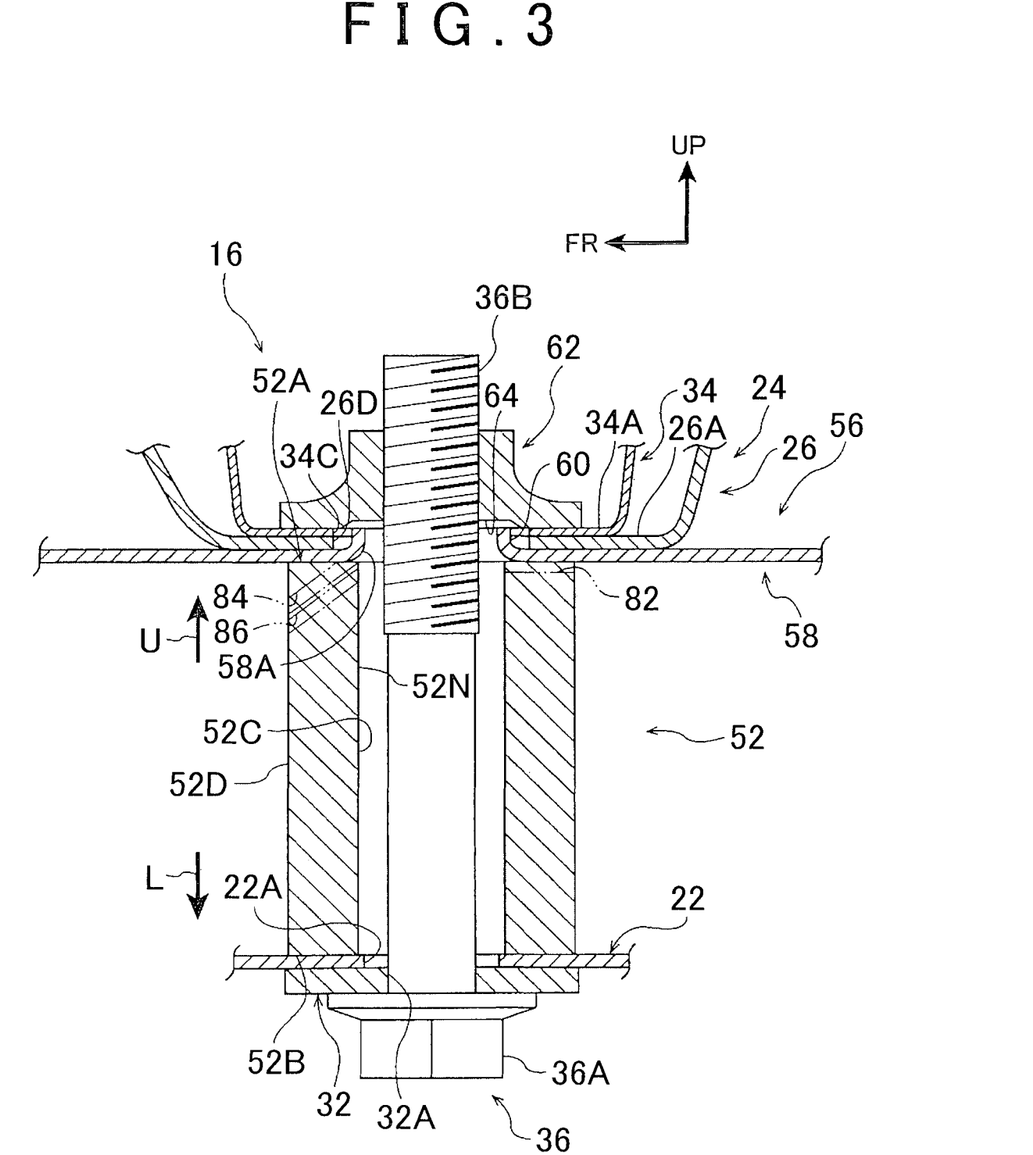
FIG. 3 is a longitudinal sectional view of a fastening portion structure of a vehicle according to a second example embodiment of the invention.

Next, a fastening portion structure of a vehicle according to a second example embodiment of the invention will be described with reference to FIG. 3. FIG. 3 is a longitudinal sectional view of the fastening portion structure of a vehicle according to this example embodiment. The structure of this example embodiment is essentially the same as the structure in the first example embodiment, except for the points described below. Therefore, components in this example embodiment that are essentially the same as components in the first example embodiment will be denoted by like reference characters, and descriptions of these components will be omitted.

In this example embodiment, a collar 52 is arranged instead of the collar 30 (see FIG. 1) of the first example embodiment. The collar 52 has a cylindrical shape with constant inner and outer diameters, and the axial direction of the collar 52 is set to the vehicle vertical direction. An end surface 52A on one side in the axial direction (i.e., the side in the direction of arrow U) of the collar 52 is arranged farther toward the vehicle upper side than an end surface 52B on the other side in the axial direction (i.e., the side in the direction of arrow L). Also, the end surface 52A on the one side in the axial direction (i.e., the side in the direction of arrow U) of the collar 52 and the end surface 52B on the other side in the axial direction (i.e., the side in the direction of arrow L) of the collar 52 are planes that are perpendicular to the axial direction of the collar 52.

A suspension member 56 includes an upper plate portion 58 as a first plate portion, instead of the upper plate portion 20 (see FIG. 1) in the first example embodiment. Except for this, the structure of the suspension member 56 is the same as the structure of the suspension member 14 in the first example embodiment. The upper plate portion 58 abuts against the end surface 52A on one end in the axial direction (i.e., the side in the direction of arrow U) of the collar 52. Also, an upper hole 58A as a first hole is formed through the upper plate portion 58, in a position overlapping with a through-portion 52C of the collar 52.

The bottom plate portion 26A of the bracket 26 is placed on the opposite side of the upper plate portion 58 of the suspension member 56 from the side with the collar 52 (i.e., on the vehicle upper side). The bolt through-hole 26D that is formed through the bottom plate portion 26A is arranged in a position overlapping with the through-portion 52C of the collar 52 and the upper hole 58A of the upper plate portion 58 of the suspension member 56.

A bolt insertion hole 34C is formed through the seat plate portion 34A of the reinforcing bracket 34. This bolt insertion hole 34C is arranged in a position overlapping with the bolt through-hole 26D of the bracket 26. An inner diameter of the bolt insertion hole 34C is set larger than the inner diameter of the bolt through-hole 34B (see FIG. 1) in the first example embodiment, and is set to the same dimension as the inner diameter of the bolt through-hole 26D of the bracket 26.

A weld nut 62 as a nut, instead of the weld nut 38 (see FIG. 1) in the first example embodiment, is fixed to an outer peripheral portion of the bolt insertion 34C in advance, on the upper surface (i.e., the surface on the side opposite the side with the collar 52) of the seat plate portion 34A of the reinforcing bracket 34. A portion corresponding to the positioning portion 38B of the weld nut 38 shown in FIG. 1 is not formed on this weld nut 62.

As shown in FIG. 3, the bolt 36 is inserted from the vehicle lower side, through the through-portion 32A of the washer 32, the lower hole 22A of the suspension member 56, the through-portion 52C of the collar 52, the upper hole 58A of the suspension member 56, the bolt through-hole 26D of the bracket 26, and the bolt insertion hole 34C of the reinforcing bracket 34. Also, the bolt 36 and the weld nut 62 apply a fastening load to the washer 32, the lower plate portion 22 of the suspension member 56, the collar 52, the upper plate portion 58 of the suspension member 56, the bottom plate portion 26A of the bracket 26, and the seat plate portion 34A of the reinforcing bracket 34, by the shaft portion 36B of the bolt 36 being screwed into the weld nut 62.

Meanwhile, a protruding portion 60 that is bent towards the side opposite the side with the collar 52 and protrudes toward the bolt through-hole 26D side of the bottom plate portion 26A of the bracket 26, is formed on an end portion of the suspension member 56 that is on the side with the upper hole 58A of the upper plate portion 58. This protruding portion 60 is formed along the entire periphery of a hole peripheral portion of the upper hole 58A. Also, a recessed portion 64 that is recessed toward the side opposite the side with the protruding portion 60 (i.e., to the vehicle upper side) is formed on a surface opposing the protruding portion 60, of the weld nut 62 that is arranged opposite the protruding portion 60. Also, a top surface of the protruding portion 60 extends into the opening of the recessed portion 64 of the weld nut 62. That is, the protruding portion 60 passes through the bolt through-hole 26D of the bottom plate portion 26A of the bracket 26, and the bolt insertion hole 34C of the seat plate portion 34A of the reinforcing bracket 34.

Next, the operation and effects of the foregoing example embodiment will be described.

In this example embodiment, water is inhibited from getting inside the collar 52 by the protruding portion 60 of the upper plate portion 58. Also, this protruding portion 60 is formed along the entire periphery of the hole peripheral portion of the upper hole 58A, so water is inhibited from getting inside the collar 52 by the protruding portion 60 along the entire periphery of the collar 52.

Also, in this example embodiment, the recessed portion 64 that is recessed toward the side opposite the side with the protruding portion 60, is formed on the surface opposing the protruding portion 60, of the weld nut 62. Therefore, interference between the weld nut 62 and the protruding portion 60 is able to be more easily avoided, even if the protrusion dimension of the protruding portion 60 is set long, compared to when the recessed portion 64 is not provided. Accordingly, the protrusion dimension of the protruding portion 60 can be set long, i.e., water is able to be effectively prevented or inhibited from getting inside the collar 52, while avoiding a decrease in fastening load caused by interference between the weld nut 62 and the protruding portion 60.

As described above, the fastening portion structure of a vehicle according to this example embodiment makes it possible to prevent or inhibit water from accumulating inside the collar 52.

[Third example embodiment]

Figure 4:
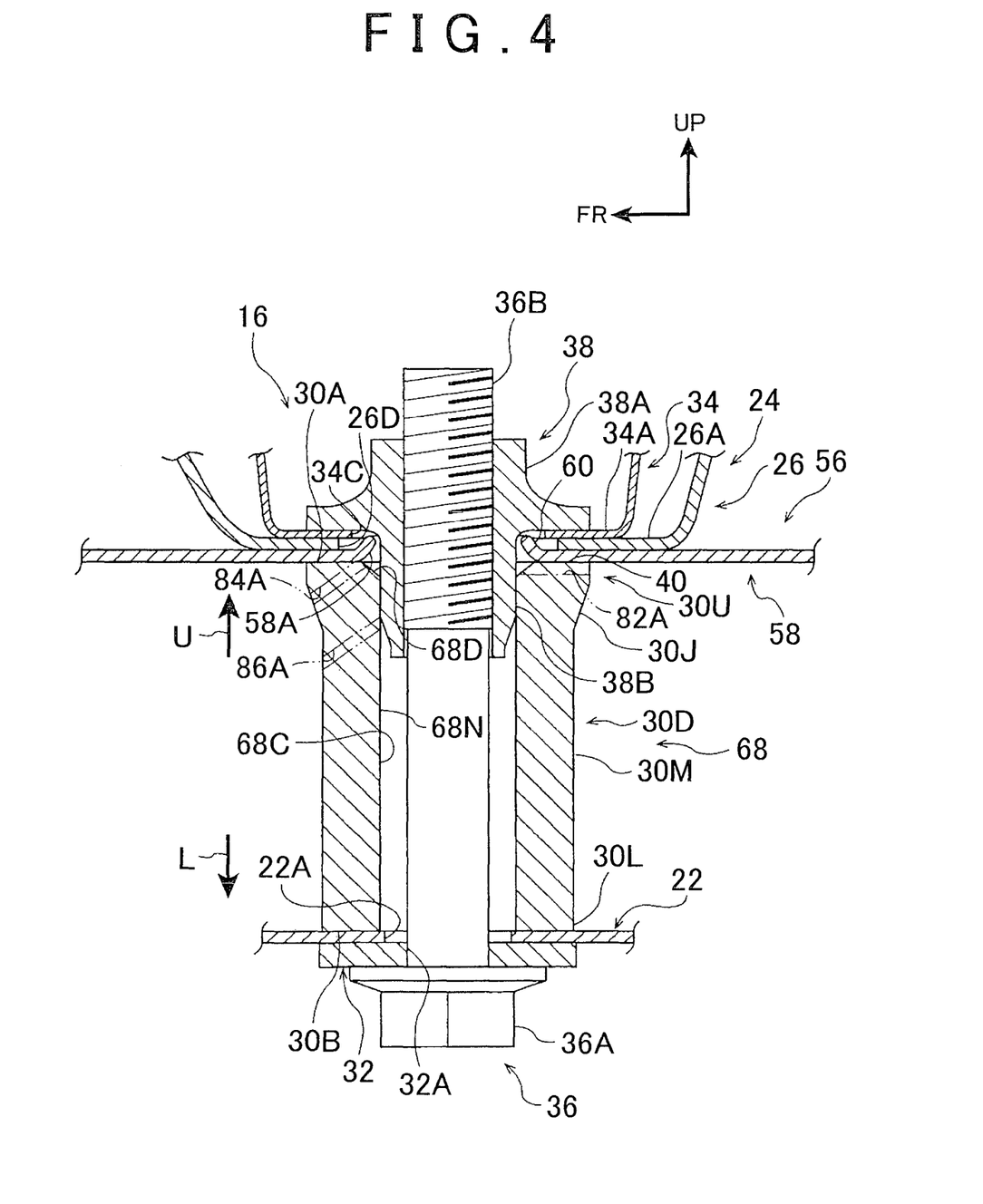
FIG. 4 is a longitudinal sectional view of a fastening portion structure of a vehicle according to a third example embodiment of the invention.

Next, a fastening portion structure of a vehicle according to a third example embodiment of the invention will be described with reference to FIG. 4. FIG. 4 is a longitudinal sectional view of the fastening portion structure of a vehicle according to this example embodiment. The structure of this example embodiment is essentially the same as the structure in the second example embodiment, except for the points described below. Therefore, components in this example embodiment that are essentially the same as components in the first and second example embodiments will be denoted by like reference characters, and descriptions of these components will be omitted.

As shown in FIG. 4, in this example embodiment, the weld nut 38 (see FIG. 1) of the first example embodiment is arranged instead of the weld nut 62 (see FIG. 3) of the second example embodiment. Also, in this example embodiment, a collar 68 is arranged instead of the collar 52 (see FIG. 3) in the second example embodiment. The structure of this collar 68 is similar to the structure of the collar 30 (see FIG. 1) of the first example embodiment, except for that the drainage groove 50 and the protruding portion 42 formed on the collar 30 shown in FIG. 1 are not formed, and a guide portion 68D is formed long the entire periphery of an upper end opening edge portion of a through-portion 68C shown in FIG. 4. The guide portion 68D is inclined toward the insertion direction side of the positioning portion 38B of the weld nut 38, toward the radially inner side of the collar 68, and is used to guide the positioning portion 38B of the weld nut 38 into the through-portion 68C of the collar 68.

Also, the bolt 36 and the weld nut 38 apply a fastening load to the washer 32, the lower plate portion 22 of the suspension member 56, the collar 68, the upper plate portion 58 of the suspension member 56, the bottom plate portion 26A of the bracket 26, and the seat plate portion 34A of the reinforcing bracket 34, by the shaft portion 36B of the bolt 36 being screwed into the weld nut 38.

The protruding portion 60 of the upper plate portion 58 passes through the bolt through-hole 26D of the bottom plate portion 26A of the bracket 26. That is, a top surface of the protruding portion 60 extends into the opening of the bolt insertion hole 34C of the seat plate portion 34A of the reinforcing bracket 34.

With this example embodiment as well, water is able to be inhibited from getting inside the collar 68 by the protruding portion 60 of the upper plate portion 58, so water is able to be prevented or inhibited from accumulating inside the collar 68.

[Fourth example embodiment]

Figure 5:
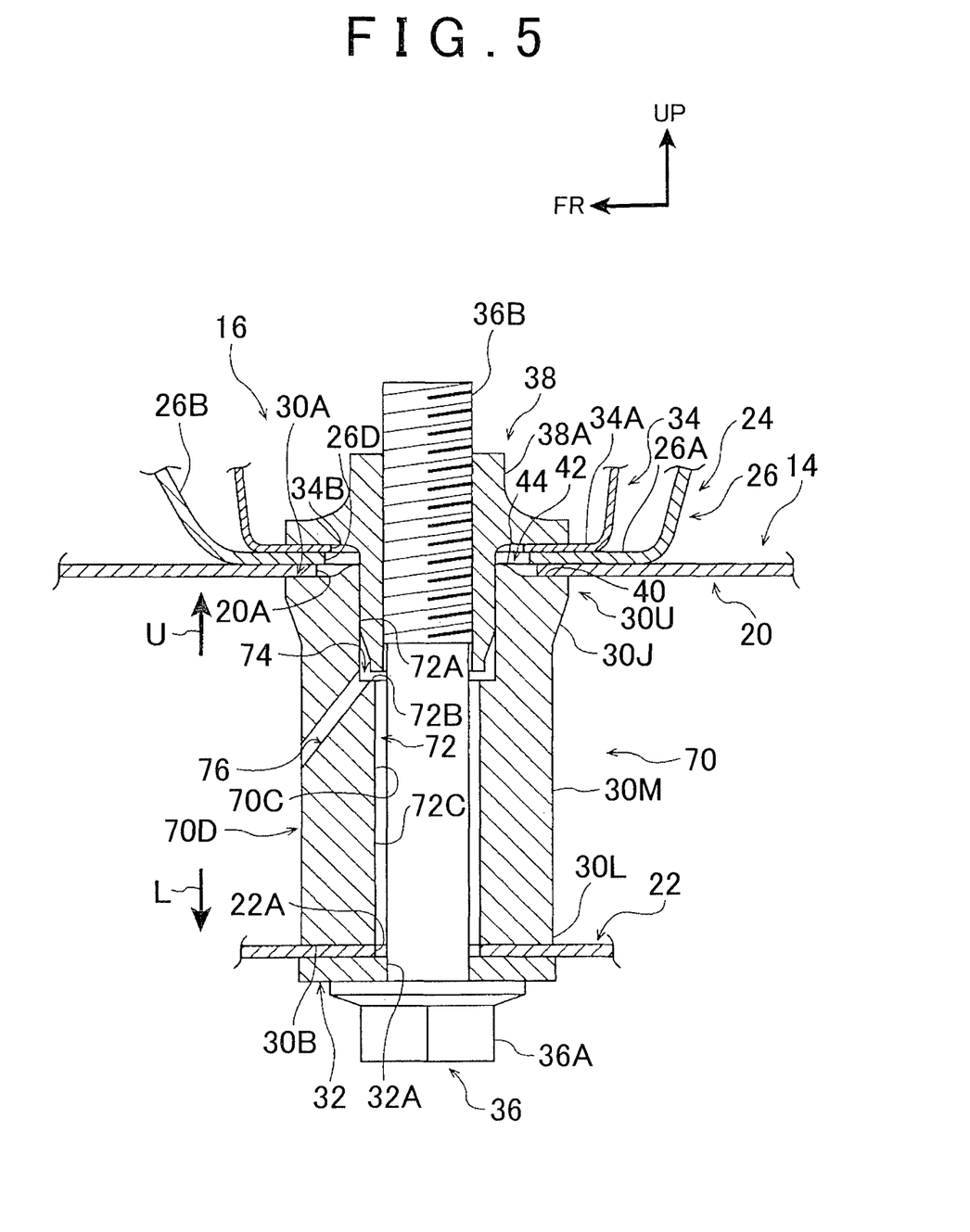
FIG. 5 is a longitudinal sectional view of a fastening portion structure of a vehicle according to a fourth example embodiment of the invention.

Next, a fastening portion structure of a vehicle according to a fourth example embodiment of the invention will be described with reference to FIG. 5. FIG. 5 is a longitudinal sectional view of the fastening portion structure of a vehicle according to this example embodiment. As shown in the drawing, the fastening portion structure of a vehicle according to this example embodiment differs from the fastening portion structure of a vehicle according to the first example embodiment in that the drainage groove 50 (see FIG. 1) is not formed on a collar 70, a drainage hole 76 as a drainage portion is formed, and a step is formed on an inner peripheral surface 72 of a through-portion 70C of the collar 70. The other structure is essentially the same as the structure in the first example embodiment. Therefore, components in this example embodiment that are essentially the same as components in the first example embodiment will be denoted by like reference characters, and descriptions of these components will be omitted.

In this example embodiment, the collar 70 is arranged instead of the collar 30 (see FIG. 1) of the first example embodiment. Except for the points described below, the collar 70 has the same structure as the collar 30 (see FIG. 1) of the first example embodiment, and is arranged in the same position there as.

An upper portion of the inner peripheral surface 72 of the through-portion 70C of the collar 70 that forms one side in the axial direction (i.e., the side in the direction of arrow U) is a large diameter portion 72A, and a portion that extends from an axially intermediate portion to a lower portion that forms the other side in the axial direction (i.e., the side in the direction of arrow L) is a small diameter portion 72C. An inner diameter of the small diameter portion 72C is set smaller than that of the large diameter portion 72A. The large diameter portion 72A and the small diameter portion 72C are connected by an annular connecting surface 72B. The connecting surface 72B is a surface that is perpendicular to the axial direction of the collar 70.

One end side of the drainage hole 76 formed through the collar 70 intersects with a boundary portion 74 of the large diameter portion 72A and the connecting surface 72B. The drainage hole 76 extends from the inner peripheral surface 72 of the through-portion 70C of the collar 70 to an outer peripheral surface 70D of the collar 70, and is inclined toward the vehicle lower side, toward the radially outer side of the collar 70. Only one drainage hole 76 is formed in this example embodiment.

In this example embodiment, water is inhibited from getting inside the collar 70 by the protruding portion 42, similar to the first example embodiment. Also, if water did happen to get past the protruding portion 42 and inside the collar 70, this water would flow along the boundary portion 74 of the large diameter portion 72A and the connecting surface 72B into the drainage hole 76, and be discharged to the outer peripheral side of the collar 70 via the drainage hole 76. As a result, water is able to be prevented or inhibited from accumulating inside the collar 70.

[Supplementary description to the example embodiments]

In the example embodiments described above, the invention is applied to a fastening portion of the bracket 26 of the front side member 24 and the suspension member 14 of the front suspension 12 of the vehicle front portion 10 shown in FIG. 2, but the invention may also be applied to a fastening portion of a side member and a rear suspension member of a rear suspension of a vehicle rear portion. Moreover, the fastening portion structure of a vehicle of the invention may also be applied to a fastening portion of another portion of a vehicle, such as a fastening portion of a suspension member and a steering gearbox, for example. The fastening portion structure of a vehicle of the invention may also be applied to a fastening portion in which the axial direction of the collar is set at an angle with respect to the vehicle vertical direction.

Also, as a modified example of the example embodiments, a protruding portion (42) may be formed on an end portion (30U) on one side in the axial direction (i.e., the side in the direction of arrow U) of a collar (30, 70), similar to in the first and fourth example embodiments (see FIGS. 1 and 5), and a protruding portion (60) may be formed on an end portion on a side with an upper hole (58A) of an upper plate portion (58) of a suspension member (56), similar to in the second and third example embodiments (see FIGS. 3 and 4).

Also, as a modified example of the first example embodiment, a drainage hole 80 as a drainage portion as indicated by the alternate long and two short dashes line in FIG. 1 may be formed through, instead of the drainage groove 50 shown in FIG. 1. The drainage hole 80 is formed leading from the end surface 30A on one side in the axial direction (i.e., the side in the direction of arrow U) of the collar 30 to the outer peripheral surface 30D of the collar 30, and intersecting with the boundary portion 46 between the flat end surface 40 and the protruding surface 44 of the protruding portion 42.

Also, as a modified example of the first example embodiment, a protruding portion may be formed in a C-shape in a vehicle plan view, around the axis of a collar (30), at an end portion (30U) on one side in the axial direction (i.e., the side in the direction of arrow U) of the collar (30), and one end portion of a drainage portion (a drainage groove or a drainage hole) may be formed at a portion where the protruding portion is not formed around the axis of the collar (30).

Also, as a modified example of the second example embodiment, a drainage groove 82 (see the alternate long and two short dashes line) as a drainage portion that leads from the end surface 52A on one side in the axial direction (i.e., the side in the direction of arrow U) of the collar 52 to an outer peripheral surface 52D of the collar 52 may be formed on the collar 52 shown in FIG. 3. Also, a drainage hole 84 (see the alternate long and two short dashes line) as a drainage portion that leads from the end surface 52A on one side in the axial direction (i.e., the side in the direction of arrow U) of the collar 52 to the outer peripheral surface 52D of the collar 52 may be formed through the collar 52. Furthermore, a drainage hole 86 (see the alternate long and two short dashes line) as a drainage portion that leads from an inner peripheral surface 52N of the through-portion 52C to the outer peripheral surface 52D of the collar 52 may be formed through the collar 52.

Also, as a modified example of the third example embodiment, a drainage groove 82A (see the alternate long and two short dashes line) as a drainage portion that leads from the end surface 30A on one side in the axial direction (i.e., the side in the direction of arrow U) of the collar 68 shown in FIG. 4 to an outer peripheral surface 30D of the collar 68 may be formed on the collar 68. Also, a drainage hole 84A (see the alternate long and two short dashes line) as a drainage portion that leads from the end surface 30A on one side in the axial direction (i.e., the side in the direction of arrow U) of the collar 68 to the outer peripheral surface 30D of the collar 68 may be formed through the collar 68.

Furthermore, a drainage hole 86A (see the alternate long and two short dashes line) as a drainage portion that leads from an inner peripheral surface 68N of the through-portion 68C to the outer peripheral surface 30D of the collar 68 may be formed through the collar 68.

Also, as a modified example of the example embodiments described above, at least one of the drainage groove 50 and the drainage hole 80 shown in FIG. 1 may be formed in the collar, and the drainage hole 76 shown in FIG. 5 may be formed in the collar.

Also, as a modified example of the first, third, and fourth example embodiments (see FIGS. 1, 4, and 5), the bolt 36 and the weld nut 38 may be vertically switched. Also, as a modified example of the first to the fourth example embodiments (see FIGS. 1, 3, 4, and 5), the bolt 36 and the weld nut 38, 62 may be vertically switched, and a recessed portion that is recessed toward the opposite side (i.e., the vehicle upper side) from the side with a protruding portion (42, 60) may be formed on the surface opposing the protruding portion (42, 60), of a head portion (36A) of a bolt (36) arranged opposite the protruding portion (42, 60).

As a modified example of the example embodiments described above, a structure may be employed in which the reinforcing bracket 34 in the example embodiments described above is arranged, and a normal nut that is not a weld nut is applied to the nut.

The foregoing example embodiments and the plurality of modified examples described above may be carried out in any suitable combination.

While one example of the invention has been described, the invention is not limited to this example, and may of course also be modified without departing from the scope thereof.

The invention claimed is:

1. A fastening portion structure of a vehicle, comprising:
   a collar including a cylindrical shape, the collar including an end surface on one side in an axial direction of the collar and the other end in the axial direction of the collar, the end surface on one side in an axial direction of the collar being arranged farther toward a vehicle upper side than the other end in the axial direction of the collar;
   a first plate portion, the end surface on the one side in the axial direction of the collar abutting against the first plate portion, the first plate portion including a first hole being formed in a position overlapping with a through-portion of the collar through the first plate portion;
   a second plate portion being placed on an opposite side of the first plate portion from a side with the collar, the second plate portion including a second hole being formed in a position overlapping with the through-portion of the collar and the first hole of the first plate portion through the second plate portion;
   a bolt being inserted through the through-portion of the collar, the first hole of the first plate portion, and the second hole of the second plate portion;
   a nut applying a fastening load to the collar, the first plate portion, and the second plate portion, together with the bolt, by the bolt being screwed to the nut; and
   a protruding portion being formed on an end portion on the side of the first plate portion with the first hole, the protruding portion protruding toward the second hole of the second plate portion.

2. The fastening portion structure according to claim 1, wherein
   a drainage portion is formed on the collar, the drainage portion leading from at least one of the end surface on the one side in the axial direction of the collar and an inner peripheral surface of the through-portion to an outer peripheral surface of the collar.

3. The fastening portion structure according to claim 2, wherein
a flat end surface is formed on the end surface on the one side in the axial direction of the collar, the flat end surface forming a planar-shaped typical surface, the flat end surface including a contact surface with the first plate portion;
the protruding portion is set to a radially inner side of the collar with respect to the flat end surface, the protruding portion being formed along an entire periphery around an axis of the collar; and
the drainage portion is formed intersecting with a boundary portion between the flat end surface and a protruding surface of the protruding portion.

4. The fastening portion structure according to claim 1, wherein
a protruding portion is formed on the end portion on the one side in the axial direction of the collar.

5. The fastening portion structure according to claim 1, wherein
a protruding portion is formed on an end portion on a side of the first plate portion with the first hole.

6. The fastening portion structure according to claim 1, wherein
a drainage groove and a drainage hole are formed in the collar, the drainage groove leading from the end surface on the one side in the axial direction of the collar to an outer peripheral surface of the collar, the drainage hole leading from an inner peripheral surface of the through-portion to an outer peripheral surface of the collar.

7. A fastening portion structure of a vehicle, comprising:
a collar including a cylindrical shape, the collar including an end surface on one side in an axial direction of the collar and the other end in the axial direction of the collar, the end surface on one side in an axial direction of the collar being arranged farther toward a vehicle upper side than the other end in the axial direction of the collar;
a first plate portion, the end surface on the one side in the axial direction of the collar abutting against the first plate portion, the first plate portion including a first hole being formed in a position overlapping with a through-portion of the collar through the first plate portion;
a second plate portion being placed on an opposite side of the first plate portion from a side with the collar, the second plate portion including a second hole being formed in a position overlapping with the through-portion of the collar and the first hole of the first plate portion through the second plate portion;
a bolt being inserted through the through-portion of the collar, the first hole of the first plate portion, and the second hole of the second plate portion;
a nut applying a fastening load to the collar, the first plate portion, and the second plate portion, together with the bolt, by the bolt being screwed to the nut; and
a protruding portion being formed on at least one of an end portion on the one side in the axial direction of the collar and an end portion on the side of the first plate portion with the first hole, the protruding portion protruding toward the second hole of the second plate portion,
wherein a recessed portion is formed on a surface opposing the protruding portion, of one of the nut and a head portion of the bolt, whichever is arranged opposing the protruding portion, the recessed portion being recessed toward an opposite side from a side with the protruding portion.

8. A fastening portion structure of a vehicle, comprising:
a collar including a cylindrical shape, the collar including an end surface on one side in an axial direction of the collar and the other end in the axial direction of the collar, the end surface on one side in an axial direction of the collar being arranged farther toward a vehicle upper side than the other end in the axial direction of the collar;
a first plate portion, the end surface on the one side in the axial direction of the collar abutting against the first plate portion, the first plate portion including a first hole being formed in a position overlapping with a through-portion of the collar through the first plate portion;
a second plate portion being placed on an opposite side of the first plate portion from a side with the collar, the second plate portion including a second hole being formed in a position overlapping with the through-portion of the collar and the first hole of the first plate portion through the second plate portion;
a bolt being inserted through the through-portion of the collar, the first hole of the first plate portion, and the second hole of the second plate portion;
a nut applying a fastening load to the collar, the first plate portion, and the second plate portion, together with the bolt, by the bolt being screwed to the nut; and
a protruding portion being formed on at least one of an end portion on the one side in the axial direction of the collar and an end portion on the side of the first plate portion with the first hole, the protruding portion protruding toward the second hole of the second plate portion,
wherein a drainage portion is formed on the collar, the drainage portion leading from at least one of the end surface on the one side in the axial direction of the collar and an inner peripheral surface of the through-portion to an outer peripheral surface of the collar.

9. The fastening portion structure according to claim 8, wherein
a flat end surface is formed on the end surface on the one side in the axial direction of the collar, the flat end surface forming a planar-shaped typical surface, the flat end surface including a contact surface with the first plate portion;
the protruding portion is set to a radially inner side of the collar with respect to the flat end surface, the protruding portion being formed along an entire periphery around an axis of the collar; and
the drainage portion is formed intersecting with a boundary portion between the flat end surface and a protruding surface of the protruding portion.

* * * * *